United States Patent

[11] 3,596,316

[72] Inventors Richard C. Palermo
West Webster;
Charles Dolcimascolo, Fairport, both of, N.Y.
[21] Appl. No. 757,249
[22] Filed Sept. 4, 1968
[45] Patented Aug. 3, 1971
[73] Assignee Xerox Corporation
Rochester, N.Y.

[54] BLOW-MOLDING APPARATUS
3 Claims, 9 Drawing Figs.
[52] U.S. Cl. ................................................. 18/5 BM,
249/112
[51] Int. Cl. ..................................................... B29c 5/06
[50] Field of Search............................................. 18/5 BA, 5
BC, 5 BE, 5 BF, 5 BH, 5 BJ, 5 BK, 5 BL, 5 BM, 5
BN, 5 BB, 30 WN, 30 WP, 35, Digest 55;
249/112; 264/98

[56] References Cited
UNITED STATES PATENTS
| | | | |
|---|---|---|---|
| 2,783,521 | 3/1957 | Vondrous et al. ............. | 249/112 |
| 3,320,344 | 5/1967 | Slipp ............................. | 264/344 |
| 3,347,966 | 10/1967 | Seefluth ........................ | 18/5 X |
| 3,428,725 | 2/1969 | Delmonte...................... | 264/227 X |

*Primary Examiner*—H. A. Kilby, Jr.
*Attorneys*—Paul M. Enlow, Norman E. Schrader, James J. Ralabate, Ronald Zibelli and Thomas J. Wall

ABSTRACT: A flexible one-piece liner of elastomer material insertable in a blow-molding cavity, the internal surface of the liner conforming to the shape and texture of the article to be blow molded. After molding, the liner is deformed sufficiently to permit the molded article to be separated therefrom.

BLOW-MOLDING APPARATUS

This invention relates to blow molding and, in particular, to a flexible liner for use in blow-molding apparatus.

It has heretofore been the general practice in the blow-molding art to form a thermoplastic part within a split or sectional mold cavity capable of being parted in at least one plane. Thermoplastic material is introduced into the cavity and forced by means of pressurized air or the like into conformity with the walls of the mold cavity to produce an article of desired configuration. The mold is then parted in at least one plane and the finished article removed.

The reproduction of an article having a precisioned textured surface, as for example a gravure roll, by means of conventional blow-molding methods has heretofore proven unsatisfactory. In most conventional blow-molding techniques, a "flash" of waste material is formed on the blow-molded article along the line where the blow-molding dies part. The reproduction of this parting line on the finished article, of course, will destroy the continuity of a precision textured surface has heretofore been prohibitive.

It is therefore a primary object of this invention to improve blow-molding apparatus.

A further object of this invention is to provide apparatus by which a flash-free blow-molded article is produced.

Yet another object of this invention is to improve blow-molding apparatus so that a finished particle having a homogeneous precision textured outer surface is formable.

A still further object of this invention is to improve blow-molding apparatus capable of accurately reproducing a textured article which is flash-free.

These and other objects of the present invention are attained by means of a one-piece flexible liner cast of an elastomer material which is insertable in a blow mold cavity, the flexible liner is cast to the shape and texture of the article to be blow molded.

For a better understanding of the invention as well as other objects and further features thereof, reference is had to the following detailed description to be read in connection with the accompanying drawings, wherein.

Figure 8:
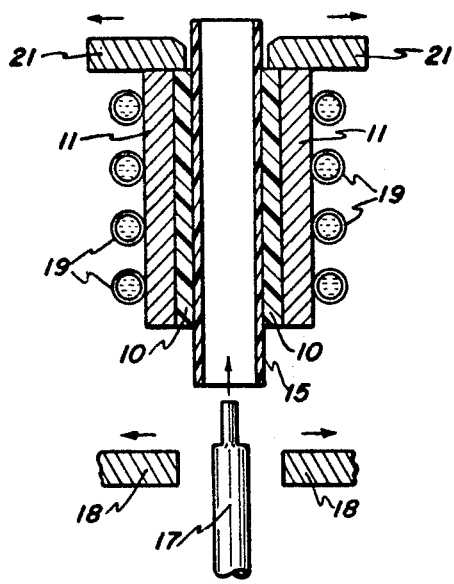
Figure 9:
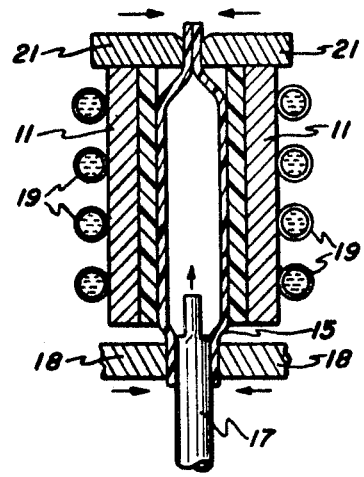

FIGS. 3—7 illustrate different stages during the formation of a molded article using the apparatus of the instant invention;

FIGS. 8 and 9 illustrate a second embodiment utilizing the apparatus of the present invention.

This invention will be described in reference to the blow molding of a gravure roll. A gravure roll, as herein referred to, is an ink doner device employed in the printing art to transport ink from an ink reservoir to a printing plate. The outer surface of the roll is made of a series of uniform impressions or cells, as for example, helical grooves, which are adapted to deposit and even layer of ink on the plate as the roll is moved thereover. The roll is in effect an ink-metering device whose functional accuracy is dependent on the precision with which the outer surface is formed. It should be clear, however, that the teachings of the present invention are not limited to the formation of this single item and the apparatus described herein is adaptable to reproduce an extremely wide variety of thermoplastic parts and shapes not readily moldable by more conventional methods.

Figure 1:
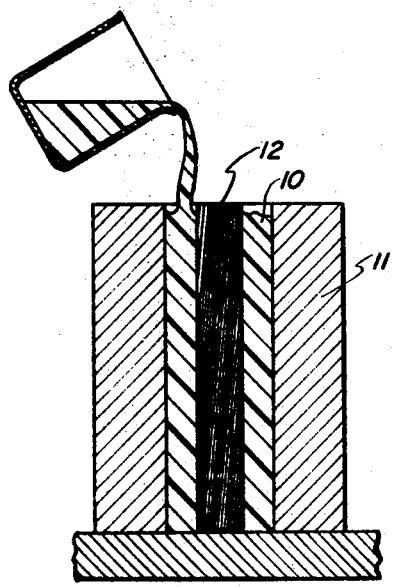
FIG. 1 is a sectional view illustrating the formation of a flexible liner.

The flexible liner of the present invention is prepared by casting an elastomer material against a master or pattern of the finished part. As shown in FIG. 1, a pattern 12 of the gravure roll to be reproduced is accurately formed and the pattern centered in the cavity provided in steel backup sleeve 11. The pattern can be accurately reproduced from such materials as steel, wax, wood or plaster. A castable rubberlike material is liquid form capable of producing a high-resolution replica of the textured gravure roll surface is poured into the cavity around the pattern and the castable material allowed to harden in contact with the textured surface to form a flexible liner.

Figure 2:
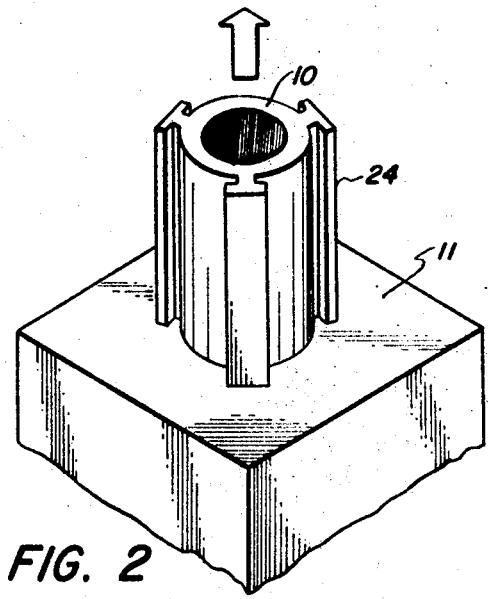
FIG. 2 is a perspective view showing the flexible liner inserted in a support member.
Figure 3:
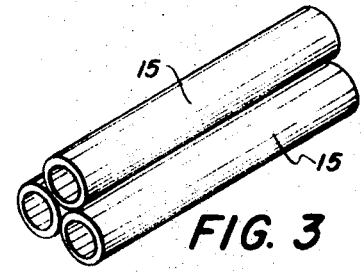

Referring now to FIG. 2, the castable liner 10 is formed within the backup member 11 having a series of T-shaped lugs 24 thereon. The lugs are offset around the outer periphery of the liner so that the liner and the backup member are mateable in one relative position, the position in which the flexible liner is cast. The cast flexible liner, upon hardening, is removable from the backup member by sliding the liner out the opening provided in the backup member. Any suitable hardenable material may be used to form the flexible molds. It is important that the flexible mold material be tough and elastic while having good strength and resistence to abrasion. Typical hardenable materials include the elastomers of styrene-butadiene, polybutadiene, neoprene, butyl, polyisoprene, nitrile, ethylene-propylene, and polyurethane rubber. The term elastomer as herein used refers to any polymer having rubberlike properties and is not limited to the elastomers specifically indicated above.

It is preferred that the flexible mold be prepared using a curable polyurethane material. Excellent results have been obtained with polyurethane compounds which are capable of being cured in a hot air oven at a temperature of about 200° F. Polyurethane elastomer rubbers may be produced through the reaction of certain polyisocynates and polyhydroxy compounds to form long chains which are essentially linear macromolecules. The material is then chain extended and crossed linked to complete the reaction. Polyurethane elastomers are currently commercially produced with a hardness range that extends from 30 Shore A up to 75 Shore D. These elastomers are extremely tough and elastic and have excellent tensile and tear strength. An example of such elastomers are "Texins" manufactured by the Mobay Chemical Company and "Adiprene" manufactured by E. I. DuPont De Nemours Company. Various chemicals are used to crosslink the prepolymers of polyurathane such as diamines, in particular, 4, 4' methylenebis (2-chloroaniline) also called "-MOCA," as well as combinations of diols and triols used alone or in combination. Any suitable catalyst such as metal soaps, lead, cobalt naphthenate, potassium acetate, and titanate esters and other materials capable of generating free radicals may be used to increase the resilience of the materials. The curable material is placed in a vacuum to remove entrapped air and then introduced into the cavity in contact with the surface to be reproduced and the casting material allowed to cure before it is peeled from the pattern.

A release agent having adhesive properties such as silicone oil can be coated on the pattern surface prior to casting of the flexible mold to facilitate removal of the mold from the pattern. The mold is stripped from the pattern by first trimming the mold ends to permit passage of the pattern therefrom and deforming the mold sufficiently by mechanical or pneumatic forces to effect part separation. In practice a jet of high-pressure air is used to effect separation of the two parts.

Silicone rubbers also provide a high-resolution replica of the flexible mold formed of a hardenable material. Silicone rubbers are formed from silicone gums largely made up of polymers of dimethyl siloxane. Finely divided fillers such as silica gel, calcium carbonate, titanium dioxide, iron oxide or mixtures thereof may be mixed with the silicone gum to increase the tensile strength of the silicone rubber replica. Generally, image resolution will increase with a decrease in the average filler particles diameter and diameters in the range from about 10 millimicrons to approximately 1 micron are desirable. Suitable catalysts such as metal soaps, peroxides and other materials capable of generating free radicals may also be used to cure the silicone gum compounds with the rate of curing depending upon the relative quantity of the catalyst employed. Satisfactory curing rates are achieved when up to approximately 5 percent by weight of the catalyst based on the weight of the silicone rubber is employed. Curing is believed to occur by the formation of siloxane cross-linked between the polymer chain. The curable material is placed in a vacuum to remove entrapped air and then introduce into the mold in contact with the surface to be formed. The casting material is allowed to cure before being removed from the pattern. One or more multiple compounds of silicone rubber are RTV-11, RTV-20, RTV-60, RTV-112, RTV-116, and RTV-118 available from General Electric, Silastic RTVS-5137A which are available from the Dow Corning Company, or mixtures thereof.

The blow-molding process of the present invention will be described with reference to FIGS. 2—6. Parisons 15 (FIG. 3) are first extruded from a thermoplastic material and then the parisons are cut into the desired lengths. Although an intermittent parison extrusion method will herein be described, it should be obvious that the present invention is fully capable of being adopted for use in the conventional parison transfer technique in which the extruding and molding operations are integrated. The preformed parison is first positioned in thermal communication with a heat source, such as heating plates 16 shown in FIG. 3 and heated to the desired blow-molding temperature. A blow pin 17 is inserted into the heated parison and clamped in position by means of clamping means 18. The opposite end of the parison is shut and heat-sealed against leakage by any suitable means while the parison is still in thermal communication with heat source 16.

Figure 4:
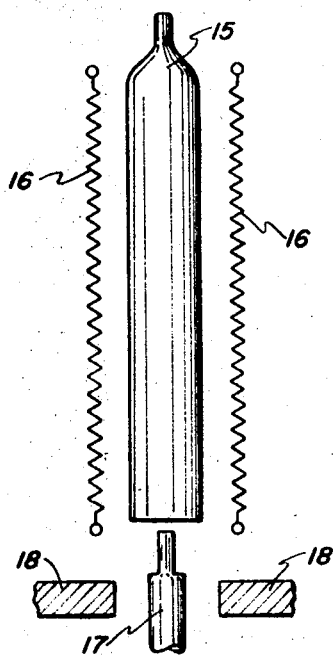
Figure 5:
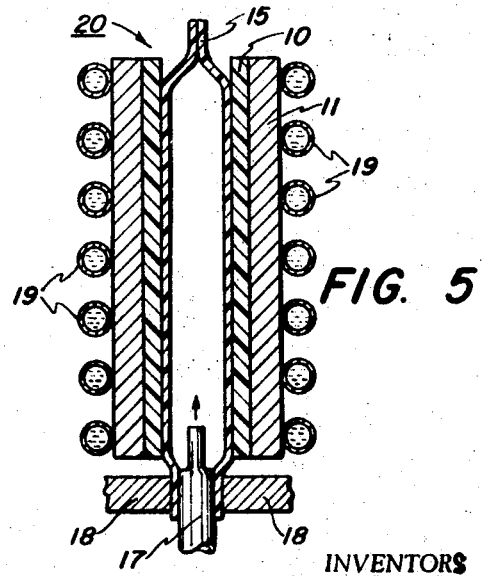

As shown in FIG. 4, flexible liner 10, which has been stripped from master pattern 12, is placed within a rigid backing sleeve. It is important that the outer surface of the flexible tool and the backup member fit together in contiguous relation so that no voids or air gaps exist therebetween. The flexible liner would be deformed as the thermoplastic material is forced into contact therewith to fill these voids thus resulting in the reproduction of a defective part. As noted, the form used during the casting step (shown in FIG. 1) is also used as the supporting member in the molding process to assure that a void-free fit is maintained between the flexible member and the support member.

As shown in FIG. 4, the mold and backup assembly 20 is placed over the heated parison and blow pin. Pressurized fluid, such as air, is then introduced through the blow pin by any suitable means. The blow air forces the heated thermoplastic material against the inside surface of the flexible mold. Although the elastomer material of which the mold is formed is flexible, it is nevertheless substantially noncompressible at the blow-molding pressures and temperatures. The rigidly supported mold therefore resists further expansion of the parison so that the parison material is forced into conformity with the inside contour of the mold cavity.

Figure 6:
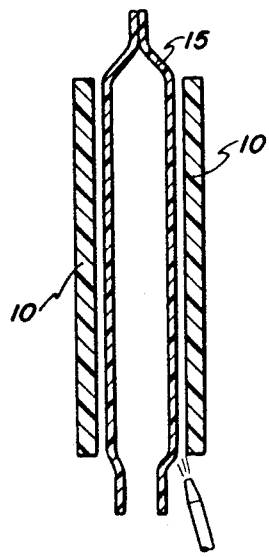

Next, the blow-molded part is allowed to cool while still under pressure. Should a room temperature tool not provide sufficient cooling capacity for the process, cooling coils 19 (FIG. 4) are provided to circulate cooling water around the molding tool. Upon cooling, the backup sleeve is removed from the flexible cast tool and pneumatic or mechanical forces employed to strip the flexible tool from the rigid cooled plastic part. As seen in FIG. 6, a nozzle 23 directs a jet of air between the part and the mold under sufficient pressure to cause the two parts to separate. However, T-shaped lugs 24 (FIG. 2) positioned around the outer periphery of the liner provide a means by which the liner can be grasped and mechanically deformed to effect separation. Because the mold materials and the thermoplastic parison materials are in most cases incompatible, a release agent is generally not required to produce complete part separation. The blown plastic tube is then trimmed to the desired length to form the final article shown in FIG. 7.

Figure 7:
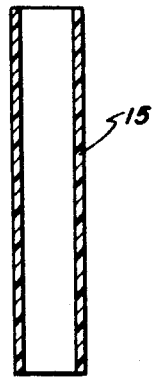

FIGS. 8 and 9 illustrate another embodiment of the present invention. A cold parison is first placed within the cavity provided within the flexible mold and backup sleeve assembly 20, (FIG. 7). A flow of hot air is directed through the inside of the parison for a sufficient period of time to bring the thermoplastic material up to blow molding temperature. The heated air is blown being directed through the parison tube by means of the blow pin, however, any other suitable means may be employed. When the parison is at the molding temperature, upper pinch members 21 are moved to a closed position sealing the end of the parison and the blow pin is inserted and clamped in position and the article blow molded. The molded final article is then removed and finished as described above.

It has been found that an extremely accurate replica of a wide variety of finely textured surfaces can be blow molded by the technique described herein. Furthermore, the final article produced is free of any parting or flash lines on the outer surface thereof. Because the flexible mold and backup sleeve are reusable, parts which heretofore were relatively expensive to produce, as for example the gravure roll as herein described, now can be rapidly and inexpensively produced.

While the invention has been described with reference to the structure disclosed herein, it is not confined to the details set forth, and this application is intended to cover such modifications or changes as may come within the purposes of the improvements or the scope of the following claims.

I claim:

1. In a blow-molding apparatus for forming a thermoplastic article, said apparatus including
   a rigid support member having an internal cavity being adapted to receive a liner therein;
   a one-piece flexible liner made of a deformable elastomer material which is substantially noncompressible at blow-molding conditions being insertable in said support member and having an internal surface precast to the shape and texture of the article to be blow molded and an exterior surface being contiguous with the walls of the cavity of said support member.

2. A liner for use in a blow-molding apparatus having a rigid support member with a molding cavity for receiving the liner comprising:
   a one-piece member made of a deformable elastomer material being substantially noncompressible at blow-molding conditions;
   said member having an internal surface precast to the shape and texture of the article to be blow molded in the apparatus; and
   said member having an external surface being contiguous with the walls of the cavity in the rigid support member.

3. The apparatus of claim 1 including
   a guide member in said rigid support member; and
   means positioned on the exterior surface of said flexible liner being capable of mating with said guide member for grasping and mechanically deforming said liner to effect separation of the blow-molded article from said liner.